(12) United States Patent
Holman et al.

(10) Patent No.: US 10,528,182 B2
(45) Date of Patent: Jan. 7, 2020

(54) MATRIX SENSORS

(71) Applicant: Tactual Labs Co., New York, NY (US)

(72) Inventors: David Holman, Toronto (CA); David Clark Wilkinson, Austin, TX (US); Ricardo Jorge Jota Costa, Toronto (CA); Bruno Rodrigues De Araujo, Toronto (CA); Adam Landa, Forest City, FL (US)

(73) Assignee: Tactual Labs Co., New York, NY (US)

( * ) Notice: Subject to any disclaimer, the term of this patent is extended or adjusted under 35 U.S.C. 154(b) by 0 days.

(21) Appl. No.: 16/055,785

(22) Filed: Aug. 6, 2018

(65) Prior Publication Data

US 2019/0227664 A1    Jul. 25, 2019

Related U.S. Application Data

(63) Continuation-in-part of application No. 16/049,159, filed on Jul. 30, 2018, and a continuation-in-part of application No. 15/904,953, filed on Feb. 26, 2018, and a continuation-in-part of application No. 15/943,221, filed on Apr. 2, 2018.

(60) Provisional application No. 62/619,656, filed on Jan. 19, 2018, provisional application No. 62/621,117, filed on Jan. 24, 2018, provisional application No. 62/657,120, filed on Apr. 13, 2018, provisional application No. 62/657,270, filed on Apr. 13, 2018.

(51) Int. Cl.
| | |
|---|---|
| *G06F 3/041* | (2006.01) |
| *G06F 3/044* | (2006.01) |
| *G06F 3/01* | (2006.01) |
| *G01D 5/252* | (2006.01) |
| *H01Q 21/28* | (2006.01) |
| *H01Q 21/30* | (2006.01) |

(52) U.S. Cl.
CPC .......... *G06F 3/0416* (2013.01); *G01D 5/252* (2013.01); *G06F 3/014* (2013.01); *G06F 3/017* (2013.01); *G06F 3/044* (2013.01); *H01Q 21/28* (2013.01); *H01Q 21/30* (2013.01); *G06F 2203/04104* (2013.01)

(58) Field of Classification Search
None
See application file for complete search history.

(56) References Cited

U.S. PATENT DOCUMENTS

2016/0098122 A1* 4/2016 Gur ................ G06F 3/044
345/174
2018/0253151 A1* 9/2018 Kletsov ................ G01S 7/412

* cited by examiner

*Primary Examiner* — Joseph R Haley
(74) *Attorney, Agent, or Firm* — Adam B. Landa

(57) ABSTRACT

An array of antennas form a sensor device. Some of the array of antennas function as receivers and some of the array of antennas function as transmitters. Each of the transmitters may transmit a unique frequency orthogonal signal that may be received at the receivers. Measurements of the received signal are then used to determine activity within field lines.

20 Claims, 18 Drawing Sheets

MATRIX SENSORS

This application is a continuation-in-part of U.S. patent application Ser. No. 16/049,159, filed Jul. 30, 2018, which in turn claims the benefit of U.S. Provisional Patent Application No. 62/619,656, filed Jan. 19, 2018. This application further claims the benefit of U.S. Provisional Patent Application No. 62/621,117, filed Jan. 24, 2018; U.S. Provisional Patent Application No. 62/657,120, filed Apr. 13, 2018; and U.S. Provisional Patent Application No. 62/657,270, filed Apr. 13, 2018, the contents of all the aforementioned applications are hereby incorporated by reference. This application is also a continuation-in-part of U.S. patent application Ser. No. 15/904,953, filed Feb. 26, 2018 and U.S. patent application Ser. No. 15/943,221, filed Apr. 2, 2018, the contents of all the aforementioned applications are hereby incorporated by reference.

FIELD

The disclosed system and method relate, in general, to the field of human computer interaction.

BACKGROUND

In recent years there have been various attempts to develop touch sensors that can detect hover at further distances above the sensor surface. One approach is described in U.S. Patent Application No. 62/428,862 filed Dec. 1, 2016 and entitled Signal Injection to Enhance Appendage Detection and Characterization. According to that specification, the invention therein relates to touch and in-air sensitive input devices. That document describes the use of signal injection (a/k/a signal infusion) to enhance appendage detection. Further disclosures concerning hover-seeking technologies can be found in U.S. Provisional Patent Application No. 62/488,753 file Apr. 22, 2017 and entitled Heterogenous Sensing Apparatus and Method, which, among other things, disclosed certain infusion techniques for use on a handheld sensor. Subsequently further disclosures were made in U.S. Provisional Patent Application No. 62/588,267, filed Nov. 17, 2017 and entitled Sensing Controller.

Trying to understand and model the position of a hand with respect to a sensor presents several challenges. For example, in an infusion system, signal from nearby digits may be confused with signal from another digit. U.S. Provisional Patent Application No. 62/533,405, filed Jul. 17, 2017, entitled Apparatus and Methods for Enhancing Digit Separation and Reproduction described techniques for digit separation. While better methods of finger separation may be developed to use existing sensor data, what is needed is a sensor that can reduce interference from e.g., nearby digits. Additionally, determination of and accurate modeling finger and hand gestures, motions and poses are also desired.

BRIEF DESCRIPTION OF THE DRAWINGS

The foregoing and other objects, features, and advantages of the disclosure will be apparent from the following more particular descriptions of embodiments as illustrated in the accompanying drawings, in which the reference characters refer to the same parts throughout the various views. The drawings are not necessarily to scale, with emphasis instead being placed upon illustrating principles of the disclosed embodiments.

DESCRIPTION

Figure 1:
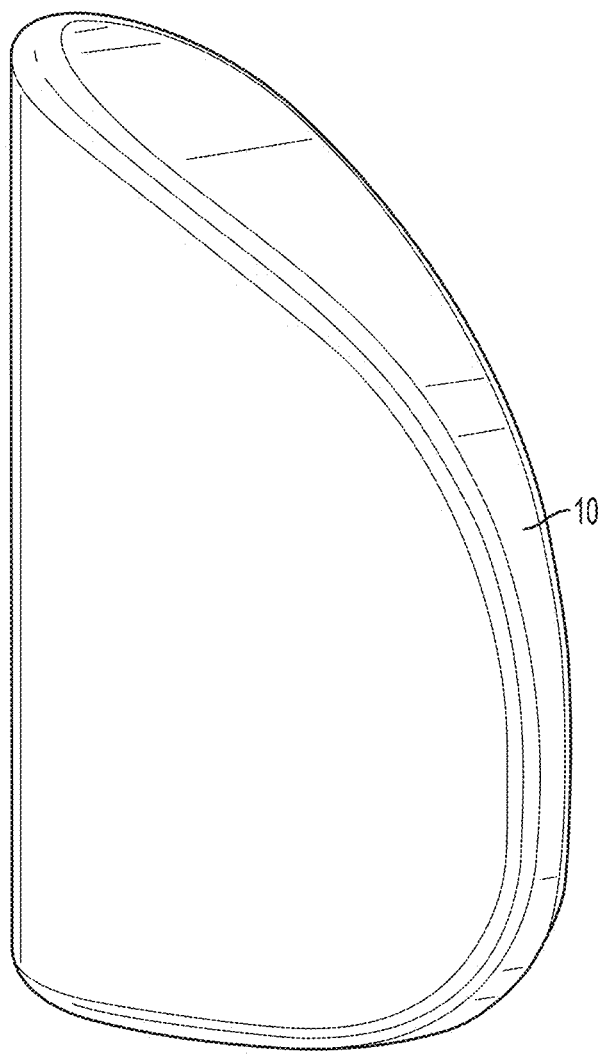
FIG. 1 shows an illustration of a hand-held controller that may be used to model the movement and position of a hand holding the controller.

This application is related to and implements concepts disclosed in U.S. Provisional Patent Application No. 62/473,908, entitled "Hand Sensing Controller"; U.S. Provisional Patent Application No. 62/488,753, entitled "Heterogenous Sensing Apparatus and Methods"; U.S. Provisional Patent Application No. 62/533,405, entitled "Apparatus and Methods for Enhancing Digit Separation and Reproduction"; and U.S. Provisional Patent Application No. 62/588,267, entitled "Sensing Controller"; the contents of which are all incorporated herein by reference.

The presently disclosed systems and methods provide for designing, manufacturing and using capacitive touch sensors, and particularly capacitive touch sensors that employ a multiplexing scheme based on orthogonal signaling such as but not limited to frequency-division multiplexing (FDM), code-division multiplexing (CDM), or a hybrid modulation technique that combines both FDM and CDM methods. References to frequency herein could also refer to other orthogonal signal bases. As such, this application incorporates by reference Applicants' prior U.S. Pat. No. 9,019,224, entitled "Low-Latency Touch Sensitive Device" and U.S. Pat. No. 9,158,411 entitled "Fast Multi-Touch Post Processing." These applications contemplate FDM, CDM, or FDM/

CDM hybrid touch sensors which may be used in connection with the presently disclosed sensors. In such sensors, touches are sensed when a signal from a row is coupled (increased) or decoupled (decreased) to a column and the result received on that column. By sequentially exciting the rows and measuring the coupling of the excitation signal at the columns, a heatmap reflecting capacitance changes, and thus proximity, can be created.

This application also employs principles used in fast multi-touch sensors and other interfaces disclosed in the following: U.S. Pat. Nos. 9,933,880; 9,019,224; 9,811,214; 9,804,721; 9,710,113; and 9,158,411. Familiarity with the disclosure, concepts and nomenclature within these patents is presumed. The entire disclosure of those patents and the applications incorporated therein by reference are incorporated herein by reference. This application also employs principles used in fast multi-touch sensors and other interfaces disclosed in the following: U.S. patent application Ser. Nos. 15/162,240; 15/690,234; 15/195,675; 15/200,642; 15/821,677; 15/904,953; 15/905,465; 15/943,221; 62/540,458, 62/575,005, 62/621,117, 62/619,656 and PCT application PCT/US2017/050547, familiarity with the disclosures, concepts and nomenclature therein is presumed. The entire disclosure of those applications and the applications incorporated therein by reference are incorporated herein by reference.

Throughout this disclosure, the terms "touch", "touches", "touch event", "contact", "contacts", "hover", or "hovers", "gesture", "pose" or other descriptors may be used to describe events or periods of time in which a user's finger, a stylus, an object, or a body part is detected by a sensor. In some sensors, detections occur only when the user is in physical contact with a sensor, or a device in which it is embodied. In some embodiments, and as generally denoted by the word "contact", these detections occur as a result of physical contact with a sensor, or a device in which it is embodied. In other embodiments, and as sometimes generally referred to by the terms "hover", "gesture" or "pose" the sensor may be tuned to allow for the detection of "touch events" that are at a distance above the touch surface or otherwise separated from the sensor device and causes a recognizable change, despite the fact that the conductive or capacitive object, e.g., a stylus or pen, is not in actual physical contact with the surface. Therefore, the use of language within this description that implies reliance upon sensed physical contact should not be taken to mean that the techniques described apply only to those embodiments; indeed, nearly all, if not all, of what is described herein would apply equally to "contact", "hover", "pose" and "gesture" each of which is a touch or touch event. Generally, as used herein, the word "hover" refers to non-contact touch events or touch, and as used herein the terms "hover", "pose" and gesture" are types of "touch" in the sense that "touch" is intended herein. Thus, as used herein, the phrase "touch event" and the word "touch" when used as a noun include a near touch and a near touch event, or any other gesture that can be identified using a sensor. "Pressure" refers to the force per unit area exerted by a user contact (e.g., presses by their fingers or hand) against the surface of an object. The amount of "pressure" is similarly a measure of "contact", i.e., "touch". "Touch" refers to the states of "hover", "contact", "gesture", "pose", "pressure", or "grip", whereas a lack of "touch" is generally identified by signals being below a threshold for accurate measurement by the sensor. In accordance with an embodiment, touch events may be detected, processed, and supplied to downstream computational processes with very low latency, e.g., on the order of ten milliseconds or less, or on the order of less than one millisecond.

As used herein, and especially within the claims, ordinal terms such as first and second are not intended, in and of themselves, to imply sequence, time or uniqueness, but rather, are used to distinguish one claimed construct from another. In some uses where the context dictates, these terms may imply that the first and second are unique. For example, where an event occurs at a first time, and another event occurs at a second time, there is no intended implication that the first time occurs before the second time, after the second time or simultaneously with the second time. However, where the further limitation that the second time is after the first time is presented in the claim, the context would require reading the first time and the second time to be unique times. Similarly, where the context so dictates or permits, ordinal terms are intended to be broadly construed so that the two identified claim constructs can be of the same characteristic or of different characteristic. Thus, for example, a first and a second frequency, absent further limitation, could be the same frequency, e.g., the first frequency being 10 Mhz and the second frequency being 10 Mhz; or could be different frequencies, e.g., the first frequency being 10 Mhz and the second frequency being 11 Mhz. Context may dictate otherwise, for example, where a first and a second frequency are further limited to being frequency-orthogonal to each other, in which case, they could not be the same frequency.

Certain principles of a fast multi-touch (FMT) sensor are known in the art and/or have been disclosed in patent applications filed prior to the date of this filing. In an embodiment, orthogonal signals are transmitted into a plurality of drive conductors, and the information received by receivers attached to a plurality of sense conductors is analyzed by a signal processor to identify touch. Drive and sense conductors (also sometimes called rows and columns) may be organized in a variety of configurations, including, e.g., a matrix where the crossing points form nodes, and touch interactions are detected at those nodes by processing of the column or sense signals. In an embodiment where the orthogonal signals are frequency orthogonal, spacing between the orthogonal frequencies, $\Delta f$, is at least the reciprocal of the measurement period T, the measurement period T being equal to the period during which the columns are sampled. Thus, in an embodiment, a column may be measured for one millisecond (T) using frequency spacing ($\Delta f$) of one kilohertz (i.e., $\Delta f=1/T$).

In an embodiment, the signal processor of a mixed signal integrated circuit (or a downstream component or software) is adapted to determine at least one value representing each frequency orthogonal signal transmitted to a row. In an embodiment, the signal processor of the mixed signal integrated circuit (or a downstream component or software) performs a Fourier transform to received signals. In an embodiment, the mixed signal integrated circuit is adapted to digitize received signals. In an embodiment, the mixed signal integrated circuit (or a downstream component or software) is adapted to digitize received signals and perform a discrete Fourier transform (DFT) on the digitized information. In an embodiment, the mixed signal integrated circuit (or a downstream component or software) is adapted to digitize received signals and perform a Fast Fourier transform (FFT) on the digitized information—an FFT being one type of discrete Fourier transform.

It will be apparent to a person of skill in the art in view of this disclosure that a DFT, in essence, treats the sequence of digital samples (e.g., window) taken during a sampling period (e.g., integration period) as though it repeats. As a consequence, signals that are not center frequencies (i.e., not integer multiples of the reciprocal of the integration period (which reciprocal defines the minimum frequency spacing)), may have relatively nominal, but unintended consequence of contributing small values into other DFT bins. Thus, it will also be apparent to a person of skill in the art in view of this disclosure that, the term orthogonal as used herein is not "violated" by such small contributions. In other words, as we use the term frequency orthogonal herein, two signals are considered frequency orthogonal if substantially all of the contribution of one signal to the DFT bins is made to different DFT bins than substantially all of the contribution of the other signal.

In an embodiment, received signals are sampled at at least 1 MHz. In an embodiment, received signals are sampled at at least 2 MHz. In an embodiment, received signals are sampled at 4 Mhz. In an embodiment, received signals are sampled at 4.096 Mhz. In an embodiment, received signals are sampled at more than 4 MHz.

To achieve kHz sampling, for example, 4096 samples may be taken at 4.096 MHz. In such an embodiment, the integration period is 1 millisecond, which per the constraint that the frequency spacing should be greater than or equal to the reciprocal of the integration period provides a minimum frequency spacing of 1 KHz. (It will be apparent to one of skill in the art in view of this disclosure that taking 4096 samples at e.g., 4 MHz would yield an integration period slightly longer than a millisecond, and not achieving kHz sampling, and a minimum frequency spacing of 976.5625 Hz.) In an embodiment, the frequency spacing is equal to the reciprocal of the integration period. In such an embodiment, the maximum frequency of a frequency-orthogonal signal range should be less than 2 MHz. In such an embodiment, the practical maximum frequency of a frequency-orthogonal signal range should be less than about 40% of the sampling rate, or about 1.6 MHz. In an embodiment, a DFT (which could be an FFT) is used to transform the digitized received signals into bins of information, each reflecting the frequency of a frequency-orthogonal signal transmitted which may have been transmitted by the transmit antenna 130. In an embodiment 2048 bins correspond to frequencies from 1 KHz to about 2 MHz. It will be apparent to a person of skill in the art in view of this disclosure that these examples are simply that, exemplary. Depending on the needs of a system, and subject to the constraints described above, the sample rate may be increased or decrease, the integration period may be adjusted, the frequency range may be adjusted, etc.

In an embodiment, a DFT (which can be an FFT) output comprises a bin for each frequency-orthogonal signal that is transmitted. In an embodiment, each DFT (which can be an FFT) bin comprises an in-phase (I) and quadrature (Q) component. In an embodiment, the sum of the squares of the I and Q components is used as measure corresponding to signal strength for that bin. In an embodiment, the square root of the sum of the squares of the I and Q components is used as measure corresponding to signal strength for that bin. It will be apparent to a person of skill in the art in view of this disclosure that a measure corresponding to the signal strength for a bin could be used as a measure related to touch. In other words, the measure corresponding to signal strength in a given bin would change as a result of a touch event.

Generally, as the term is used herein, injection or infusion refers to the process of transmitting signals to the body of a user, effectively allowing the body (or parts of the body) to become an active transmitting source of the signal. In an embodiment, an electrical signal is injected into the hand (or other part of the body) and this signal can be detected by a sensor even when the hand (or fingers or other part of the body) are not in direct contact with the sensor's touch surface. To some degree, this allows the proximity and orientation of the hand (or finger or some other body part) to be determined, relative to a surface. In an embodiment, signals are carried (e.g., conducted) by the body, and depending on the frequencies involved, may be carried near the surface or below the surface as well. In an embodiment, frequencies of at least the KHz range may be used in frequency injection. In an embodiment, frequencies in the MHz range may be used in frequency injection. To use infusion in connection with FMT as described above, in an embodiment, an infusion signal can be selected to be orthogonal to the drive signals, and thus it can be seen in addition to the other signals on the sense lines.

In various embodiments, the present disclosure is directed to systems (e.g., objects, controllers, panels or keyboards) sensitive to hover, contact, pressure, gestures and body posturing and their applications in real-world, artificial reality, virtual reality and augmented reality settings. It will be understood by one of ordinary skill in the art that the disclosures herein apply generally to all types of systems using fast multi-touch to detect hover, contact, pressure, gestures and body posturing.

The term "controller" as used herein is intended to refer to a physical object that provides the function of human-machine interface. In an embodiment, the controller may be handlebars of vehicle, such as a motorcycle. In an embodiment, the controller may be the steering wheel of vehicle, such as car or boat. In an embodiment, the controller is able to detect the movements of a hand by sensing such movements directly. In an embodiment, the controller may be the interface used with a video game system. In an embodiment, the controller may provide the position of a hand. In an embodiment, the controller may provide pose, position and/or movement of other body parts through the determination of movement proximate to and/or associated with the body part and/or function, for example, the articulation of the bones, joints and muscles and how it translates into the position and/or movement of the hand or foot.

The controllers discussed herein use antennas that function as transmitters and receivers. However, it should be understood that whether the antennas are transmitters, receivers, or both depends on context and the embodiment. When used for transmitting, the conductor is operatively connected to a signal generator. When used for receiving, the conductor is operatively connected to a signal receiver. In an embodiment, the transmitters and receivers for all or any combination of the patterns are operatively connected to a single integrated circuit capable of transmitting and receiving the required signals. In an embodiment, the transmitters and receivers are each operatively connected to a different integrated circuit capable of transmitting and receiving the required signals, respectively. In an embodiment, the transmitters and receivers for all or any combination of the patterns may be operatively connected to a group of integrated circuits, each capable of transmitting and receiving the required signals, and together sharing information necessary to such multiple IC configuration. In an embodiment, where the capacity of the integrated circuit (i.e., the number of transmit and receive channels) and the requirements of the patterns (i.e., the number of transmit and receive channels) permit, all of the transmitters and receivers for all of the multiple patterns used by a controller are operated by a common integrated circuit, or by a group of integrated circuits that have communications therebetween. In an embodiment, where the number of transmit or receive channels requires the use of multiple integrated circuits, the information from each circuit is combined in a separate system. In an embodiment, the separate system comprises a GPU and software for signal processing.

The purpose of the transmitters and receivers discussed herein are to detect touch events, movements, motions, and gestures, such as hover, proximity, hand position, gestures, poses, etc. with 3D positional fidelity. The transmitted signals can be transmitted in a particular direction. In an embodiment a mixed signal integrated circuit is used. The mixed signal integrated circuit comprises a signal generator, transmitter, receiver and signal processor. In an embodiment, the mixed signal integrated circuit is adapted to generate one or more signals and transmit the signals. In an embodiment, the mixed signal integrated circuit is adapted to generate a plurality of frequency orthogonal signals and send the plurality of frequency orthogonal signals to the transmitters. In an embodiment, the frequency orthogonal signals are in the range from DC up to about 2.5 GHz. In an embodiment, the frequency orthogonal signals are in the range from DC up to about 1.6 MHz. In an embodiment, the frequency orthogonal signals are in the range from 50 KHz to 200 KHz. The frequency spacing between the frequency orthogonal signals is typically greater than or equal to the reciprocal of an integration period (i.e., the sampling period). In an embodiment, the frequency of the signal is not changed and the amplitude of the signal is modulated instead.

The principles discussed above are used in addition to other features of the signal transmission in order to obtain meaningful information regarding positions, gestures, motions, postures, touch events, etc. of various body parts. In an embodiment, the system and methods disclosed herein use various properties of the transmitted signals in order to process this information to provide accurate depictions of hand positions and gestures.

FIG. 1 shows an illustration of a hand-held controller 10 that may be used to model the movement and position of a hand holding the controller 10. Receiver and transmitter antennas are placed around the controller 10. In an embodiment, the receiver and transmitter antennas are placed in one layer around the controller 10. In an embodiment, the receiver and transmitter antennas are placed in multiple layers around the controller 10.

The receiver and transmitter antennas can be operated selectively as either transmitters or receivers depending on the needs of the controller 10. The operation of the transmitters and receivers in matrix and other arrays are discussed in detail below. The controller 10 discussed herein is operated via the use of transmitters transmitting signals that are orthogonal with respect to each other signal transmitted. In particular, in the embodiments discussed herein the signals are frequency orthogonal with respect to each other. Additionally, the controller 10 may have incorporated therein a signal infuser that can infuse (inject) a signal into the hand of the user of the controller 10. The signal infuser is a transmitter that transmits signal into the user so that the user becomes the carrier of the signal that is then detected by receivers around the controller 10. The infused signal can be received at the receivers that are located around the controller 10. Furthermore, there may be multiple infusion points used on the controller 10.

Because receivers (i.e. receiver antennas) are omnidirectional when sensing the location of the transmitters (i.e. transmitter antennas) with respect to the receivers is important in detecting and determining the interaction of objects within the fields generated by the transmitters. Additionally, antennas often have static characteristics. For example, they have fixed surfaces areas and identities (i.e. transmitter, receiver, ground). However, it is possible to vary these characteristics in real-time to dynamically adjust the behavior of a sensor design. So for example, in an embodiment, when using the grip controller 10 shown in FIG. 1, the role of each antenna as a receiver, transmitter, infuser, etc., can be updated to reflect a new position of a hand or finger. If a hand position changes relative to a surface of the controller 10, antenna that were previously transmitters 12 could be designated as receivers 11 to ensure a more localized view of a finger.

Figure 2:
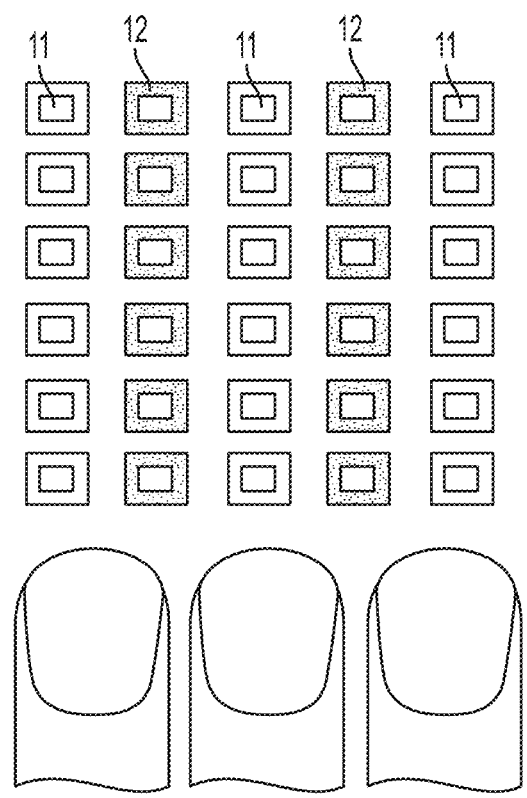
FIG. 2 shows a matrix array of antennas.

In addition to surface area, the behavior of each antenna can be changed in real-time to programmatically alter sensor design. Referring now to FIG. 2 by way of example, given a matrix of N×M antenna, such as a square geometry of 5×5 mm matrix, or a 5×6 mm matrix as shown in FIG. 2, the behavior of each element could be dynamically designated as a receiver antenna 11 or transmitter antenna 12. In an embodiment, the location of each transmitter antenna 12 with respect to each receiver antenna 11 is known, this permits each receiver antenna 11 to use its position with respect to each transmitter antenna 12 to determine information from the receipt of the unique orthogonal frequency signal from each transmitter antenna 12.

Each receiver antenna 11 can receive a unique frequency orthogonal signal from each transmitter antenna 12. By knowing the distance from each receiver antenna 11 to each transmitter antenna 12 and receiving a unique frequency orthogonal signal at that receiver antenna 11 various measurements may be taken by the sensor during a number of time frames. For instance, each receiver antenna 11 can determine the amount of signal received from each transmitter antenna 12 that is a given distance away. So for example, a receiver antenna 11 can take a measurement of the signal received from each transmitter 12 that is 2 mm aways from it. This can be performed for each of the receiver antenna 11. Therefore, a measurement that reflects the resolution of the signal space at 2 mm for the entire sensor can be taken. This can then be repeated for each receiver antenna 11 and transmitter antenna 12 that are 3 mm apart, 4 mm apart, etc. This permits the system to obtain better resolution at a distance as well as at closer distances using the same matrix array of antennas. The movement of an object or user's hand within the fields generated by the transmitters permits the system to model touch events, movements, motions, and gestures, such as hover, proximity, hand position, gestures, poses, etc.

In an embodiment, some of the antennas are infusers that also function as isolators, some antenna can also be designated as infusion transmitter antennas 12 that also isolate the response volume of a given receiver antenna 11. In an embodiment, some antennas are grounded to reduce the response of nearby receiver antennas 11. In an embodiment, fingers can be tracked along their length by using the receiver antennas 11, and the transmitter antennas 12 as isolators. In an embodiment, the antennas functioning as isolators share a common signal with an infusion signal that is applied to the body. In an embodiment, the antennas share a common signal with an infusion signal that is applied to the body, and additionally, each have another orthogonal signal that can be detected by decoding the information received at the receiver antennas 11. In an embodiment, each of the another orthogonal signals differ from each other such that each transmitter antenna 12 transmits one unique signal and one another signal (e.g., the isolation signal) that is common to all. In an embodiment, the another signal is not transmitted by adjacent transmitter antennas 12, but may be common to multiple transmitter antennas 12, e.g., every other one, or every third one.

Beyond identity of the respective antennas (i.e. whether an antenna is a receiver, transmitter, or infuser (i.e. a transmitter that transmits signal into a user)), surface area of the sensor can be programmed as well. For example, a parallel plate capacitor model demonstrates that capacitance will increase as the surface area of a plate increases. Given a matrix of square antennas, e.g., each with a surface of 5×5 mm, and a set of physical switches between each of the antennas, it is possible to dynamically change the surface area of a sensor formed of antennas. Combinations of these sensors formed of matrixed antennas can be connected using their switches. For example, a group of two matrices of antennas can be connected to produce a surface area of 50 mm$^2$ (i.e. 5×10 mm), a group four matrices can be connected to form a 100 mm$^2$ area (i.e. 10×10 mm), and so on. Of course, the 5×5 size is just illustrative, and this principle would be equally applicable to smaller and larger arrays of matrixed antenna.

Figure 3:
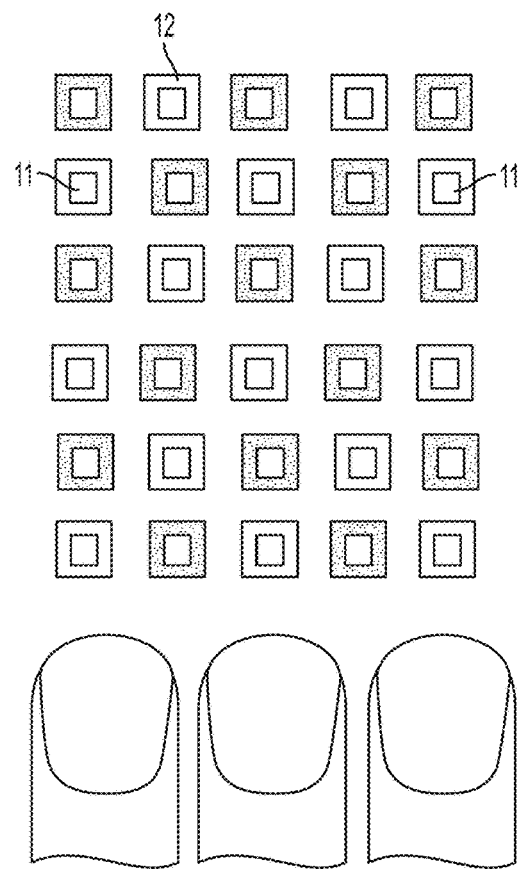
FIG. 3 shows another matrix array of antennas.

Turning to FIG. 3, shown is an embodiment of a matrix of antennas formed of receiver antennas 11 and transmitter antennas 12. In the embodiment shown in FIG. 3, the transmitter antennas 12 and the receiver antennas 11 are arranged so that they are alternating throughout the disclosed matrix array. In an embodiment, transmitter antennas 12 provide isolation between the receiver antennas 11. In an embodiment, each of the receiver antennas 11 may operate as a transmitter antenna 12 and vice versa. In an embodiment, each transmitter 12 carries an isolation signal. In an embodiment, each transmitter antenna 12 may carry one or more additional signals that are orthogonal from the isolation signal. In an embodiment, no isolation signal is used, and each of the transmitter antennas 12 carries one or more signals that are orthogonal to each signal carried by each other transmitter antenna 12 in the array.

Each receiver antenna 11 is operatively coupled to a signal processor to process the signals received thereon. Because each element can act as a transmitter antenna 12 or receiver antenna 11 as discussed above, in an embodiment, the array can be reconfigured which may assist in emulating an effectively larger receiver antenna 11 or transmitter antenna 12. In an embodiment, programmable physical connections (e.g., switches) can be employed to effectively change the surface area of an element (and thus its sensitivity) by connecting multiple of them together to act as one.

Figure 4:
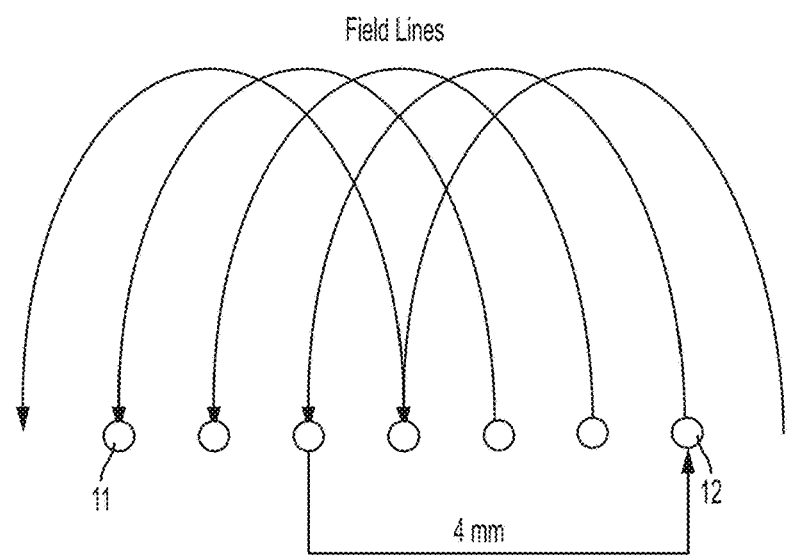
FIG. 4 is a diagram illustrating field lines and ranges between transmitting and receiving antennas.

Turning to FIG. 4, shown is an illustration of receiver antennas 11 and transmitter antennas 12 arranged in groupings. As discussed above the receiver antennas 11 and transmitter antennas 12 may be arranged in any number of combinations. In FIG. 4 the receiver antennas 11 and the transmitter antennas are arranged on a 2D plane. The receiver antennas 11 are formed into a node and the transmitter antennas 12 are formed into a node. A receiver antenna 11 is located at a set distance from a transmitter antenna 12. In the example shown in FIG. 4, a distance of 4 mm is shown between the transmitter antenna 12 and the receiver antenna 11. The transmitted signals may also come from transmitter antennas 12 located at 1 mm, 2 mm, 3 mm, 4 mm, 5 mm, 6 mm, 7 mm, etc. The field lines generated can overlap each other. Regions of transmitter antennas 12 and receiver antennas 11 can be used to form complex arrangements on a controller or other object that is able to provide information at the various signal ranges thereby being able to project the distances at which the sensors are able to sense and be able to provide good resolution at the various distances.

In an exemplary embodiment, three transmitter antennas and three receiver antennas are spaced apart from one-another (e.g., 1 mm, 1.5 mm, 2 mm, 3 mm, etc.) and oriented in a straight line. In another exemplary embodiment, four transmitter antennas and four receiver antennas are spaced apart from one-another (e.g., 1 mm, 1.5 mm, 2 mm, 3 mm, etc.) and oriented in a straight line. In yet another exemplary embodiment, five transmitter antennas and five receiver antennas are spaced apart from one-another (e.g., 1 mm, 1.5 mm, 2 mm, 3 mm, etc.) and oriented in a straight line. In yet a further exemplary embodiment, an unequal number of transmitter antennas and receiver antennas are spaced apart from one-another (e.g., 1 mm, 1.5 mm, 2 mm, 3 mm, etc.) and oriented in a straight line, e.g., three transmitter antennas and four receiver antennas. It will be apparent to a person of skill in the art in view of this disclosure that the components comprising the transmitter antennas and receiver antennas may be identical, and the decision to operate the antennas as transmitter antennas or receiver antennas may be made during operation of the sensor. In an embodiment, each of the antenna is connected to a matrix switcher, which can be configured to electrically connect the antennas to any of a plurality of transmitters or receivers.

In an embodiment, the transmitter antennas are equally spaced from and adjacent to one-another, and the receiver antennas are equally spaced from and adjacent to one-another. In an embodiment, the equal spacing between each of the transmitter antennas in an adjacent group of transmitter antennas and the equal spacing between each of the receiver antennas in an adjacent group of receiver antennas is the same (e.g., 1 mm, 1.5 mm, 2 mm, 3 mm, etc.) In an embodiment, the spacing between the transmitter group and the receiver group is the same as the equal spacing between: the transmitter antennas in the transmit group; the equal spacing between the receiver antennas in the receive group; or both. In an embodiment, the spacing between the transmit group and the receive group is greater than the equal spacing between: the transmitter antennas in the transmit group; the equal spacing between the receiver antennas in the receive group; or both. In an embodiment, the spacing between the transmit group and the receive group is the less than the equal spacing between: the transmitter antennas in the transmit group; the equal spacing between the receiver antenna in the receive group; or both.

In another exemplary embodiment, multiple groups of adjacent transmitter antennas are interspersed with multiple groups of adjacent receiver antennas, thus, for example, along a line would be found a transmit group, then a receive group, then a transmit group, then a receive group, and so on. In an embodiment, the transmitter antennas and/or the receiver antennas in the groups are electrodes. In an embodiment, the electrodes are generally a square shape. In an embodiment, the electrodes are generally a round shape. In an embodiment, the electrodes are generally a domed shape. In an embodiment, the electrodes are generally a regular shape. In an embodiment, the electrodes are generally small compared to the spacing between electrodes. In an embodiment, the electrodes are less than half the size of the spacing between adjacent similar electrodes. In an embodiment, electrode size is not more than 33% of the spacing between adjacent similar electrodes. In an embodiment, the electrodes are less than 25% of the spacing between adjacent similar electrodes. In an embodiment, the electrode width is less than 10% of the size of the spacing between adjacent similar electrodes.

Exemplary embodiments above described a configuration principally in one dimension, i.e., along a line. It will be apparent to a person of skill in the art in view of this disclosure that configurations can be designed in two dimensions and in three dimensions. In an embodiment, a grid may be formed in a second dimension such that groups are aligned from one line to the next. In an embodiment, a grid may be formed in a second dimension such that groups are not aligned from one line to the next. For example, in each successive line the groups may be staggered in position from the prior line. In the alternative, in each successive line the groups may be alternated, such that where there are transmitter antennas in one line, there are receiver antennas in the next. In an embodiment, where groups are formed from four electrodes, i.e., four receive antennas to a group or four transmitter antennas to a group, a two dimensional layout may be in kind, having four identical rows, followed by four rows where the groups are alternated, in this way creating areas of sixteen common (e.g., transmitter or receiver) antennas. Similarly a three dimensional layout may be formed. In an embodiment, an upper layer alternates receiver antennas and transmitter antennas with its adjacent layer. In an embodiment, a plurality of third dimensional layers are oriented such that there are cubes (e.g., 27, 64) of common antennas. In an embodiment, three dimensional layers are oriented such that the antenna are not positioned on a line normal to an antenna on the layer there-beneath. In an embodiment, the transmitter antennas and/or the receiver antennas are formed from linear conductors (e.g., conductive lines). The foregoing physical layouts are examples (i.e., exemplary) and not exhaustive; indeed, numerous variations will be apparent to a person of ordinary skill in the art in view of this disclosure.

The foregoing present several physical layouts for sensing. The following signaling discussion will be described in the context of a one-dimensional set of transmitter and receiver antenna grouped into repeated groupings of four antenna each. It will be apparent to a person of skill in the art in view of this disclosure that the specific one-dimensional example of these groupings is provided for ease of discussion, but can be generalized for the more complex configurations described and/or referred to above. Also for ease of use, the antennas will be referred to by a group letter and antenna number within that group. For this illustrative embodiment, elements A1-A4 and C1-C4 are receiver antennas while elements B1-B4 and D1-D4 are transmitter antennas. In this illustrative embodiment, the antennas are small regular shaped electrodes (e.g., a dot of less than about 0.25 mm) each spaced 1 mm from each other along a line. Orthogonal signals S1-S4 are transmitted on the transmitter antennas B1-B4, respectively, and orthogonal signals S5-S8 are transmitted on the transmitter antennas D1-D4. A receiver associated with each receiver antennas is configured to periodically determine at least one measurement associated with each of the orthogonal signals. In an embodiment, the periodic rate is at least 20 Hz. In an embodiment, the periodic rate is at least 100 Hz. In an embodiment, the periodic rate is at least 200 Hz. In an embodiment, the periodic rate is at least 350 Hz. In an embodiment, the periodic rate is at least 500 Hz. In an embodiment, the periodic rate is at least 1 MHz. In an embodiment, one or more of the signals (S1-S8) are comprised of numerous components, e.g., multiple frequencies, and the receiver associated with each receiver antenna is configured to periodically determine at least one measurement associated with each of the components of each orthogonal signal. In an embodiment, the at least one measurement comprises an in-phase and a quadrature component. In an embodiment, the at least one measurement is a measurement related to the magnitude of the signal or component. In an embodiment, the at least one measurement is a measurement related to the phase of the signal or component.

In an embodiment, the following 12 measurements are used to determine touch:

a measurement corresponding to signal S1 as received at A1 a measurement corresponding to signal S2 as received at A2 a measurement corresponding to signal S3 as received at A3 a measurement corresponding to signal S4 as received at A4 measurements corresponding to signals S1 and S5 as received at C1 measurements corresponding to signals S2 and S6 as received at C2 measurements corresponding to signals S3 and S7 as received at C3 measurements corresponding to signals S4 and S8 as received at C4

Each of these measurements corresponds to a receiver antenna and a transmitter antenna spaced from each other by a distance of 4 mm. In an embodiment, using antennas spaced by 4 mm provides better proximity resolution than similar measurements from similar but closer spaced elements. In an embodiment, the following ten measurements are used to determine touch:

a measurement corresponding to signal S1 as received at A2 measurements corresponding to signal S2 as received at A3 and C1 measurements corresponding to signal S3 as received at A4 and C2 measurements corresponding to signals S4 and S6 as received at C3 a measurement corresponding to signal S5 as received at C2 a measurement corresponding to signal S7 as received at C4

Each of these measurements corresponds to a receiver antennas and a transmitter antennas spaced from each other by a distance of 3 mm. In an embodiment, using antennas spaced by 3 mm provides better proximity detection than similar measurements from similar but closer spaced antennas, while providing better resolution than similar measurements from similar but more distantly spaced antennas. It will be appreciated by a person of skill in the art in view of this disclosure that this exemplary configuration can also be used to take measurements from antennas spaced by 2 mm, and from elements spaced by 1 mm. Moreover, in an embodiment, all of the foregoing overlapping field line measurements, e.g., from elements spaced by 4 mm, 3 mm, 2 mm and 1 mm, can be taken simultaneously. In an embodiment, the overlapping field line data can be used to provide a more granular view of a sensed object. In an embodiment, the overlapping field line data can be processed to provide proximity information and location resolution. In an embodiment, the overlapping field line data can be processed to provide more delineation between separate components being detected (i.e. disambiguate fingers, etc.). In an embodiment, interpolation is used to process the data to identify touch. In an embodiment, the overlapping field line data is interpolated to provide both proximity information and location information. In this same manner, data can be measured, collected and processed in other one-dimensional configurations, in two dimensional configurations and in three dimensional configurations to provide proximity and location information.

A signal processor is able to take the signals received from the various ranges and use them in order to form heat maps at those ranges. For example, a heat map can be taken at the 2 mm and the 4 mm range in order provide information and data regarding interaction at those ranges. The heatmaps formed at the ranges disclosed can be formed and constructed using overlapping nodes and antennas (i.e. all transmitter antennas and receiver antennas 4 mm apart can be used to form the heat map.) When a heat map is taken within a certain range, for instance the 4 mm range, a measurement of a unique frequency orthogonal signal from a transmitter 12 located 4 mm from a receiver antenna 11 is determined by the system. This can be done for each unique frequency orthogonal signal that is transmitted from a transmitter antenna 12 that is located 4 mm from a receiver antenna 11. This can be accomplished for other ranges as well so that clusters of receiver antennas 11 may be able to get heat maps for different ranges of transmitter antennas 12. Thus the interaction of user within the fields generated by the transmitter antennas 12 can be reflected in the heat maps generated for the different ranges.

Figure 5:
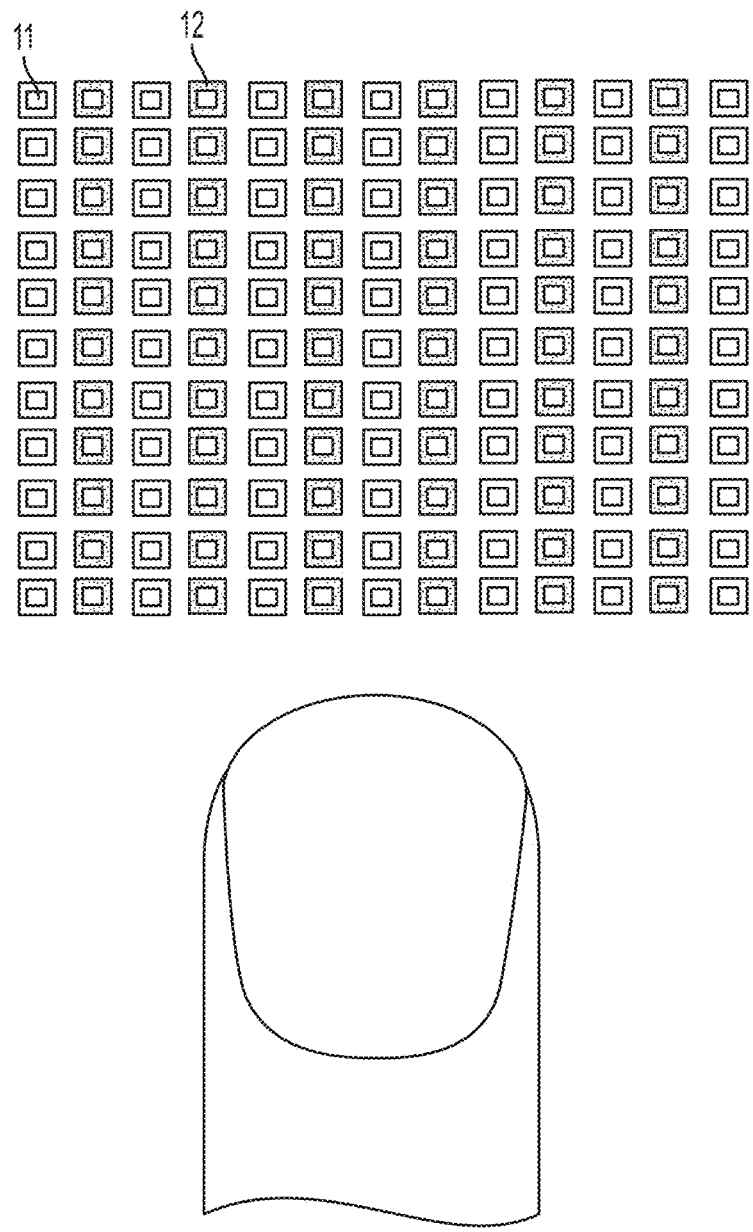
FIG. 5 shows another matrix array of antennas.
Figure 6:
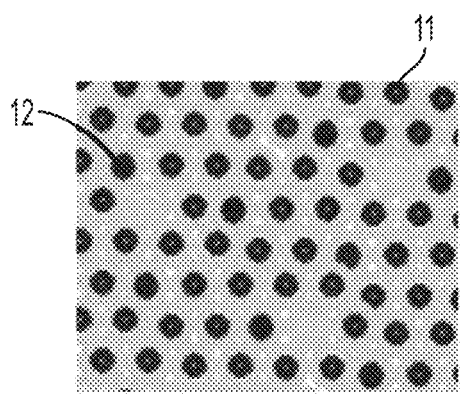
FIG. 6 shows another matrix array of antennas.

Turning to FIG. 5, another illustrative sensor array is shown. A fingertip is shown for scale. In an embodiment, the transmitter antennas 12 provide isolation between the receiver antennas 11. In an embodiment, the transmitter antennas 12 and the receiver antennas 11 can switch roles. In an embodiment, each transmitter antenna 12 carries an isolation signal. In an embodiment, each transmitter antenna 12 may carry one or more additional signals that are orthogonal from the isolation signal. In an embodiment, no isolation signal is used, and each of the transmitter antenna 12 carries one or more signals that are orthogonal to each signal carried by each other transmitter antenna 12 in the array. Each receiver antenna 11 is operatively coupled to a signal processor to process the signals received thereon. As discussed above, in an embodiment, the array can be reconfigured to have effectively larger groupings of receiver antennas 11 or larger groupings of transmitter antennas 12. FIG. 6 shows another array of transmitter antennas 12 and receiver antennas 11. In FIG. 6, some of the sensor elements may be used as ground.

Figure 7:
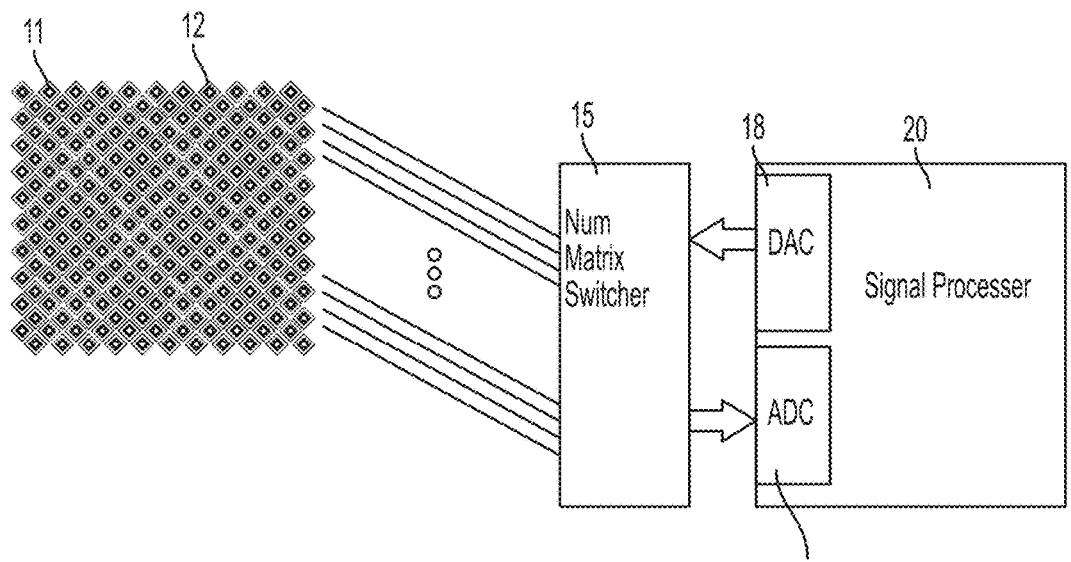
FIG. 7 is a diagram of a matrix array of antennas and a N×M matrix switcher.

FIG. 7 shows an embodiment of one aspect of the invention comprising a dense array of receiver antennas 11 and transmitter antennas 12 that are each individually connected to a N×M switcher 15 that will switch any input to any output. The N×M switcher 15 is then connected to an input channel 16, which is an analog digital converter (16) and output channel 18, which is a digital analog converter (DAC) on a touch sensor chip which is configured to generate and transmit the required orthogonal signals, and to receive and process incoming signals using the signal processor 20. In this configuration, any of the antenna elements can be used individually or can be combined with others in order to form the receiver antennas 11 and the transmitter antennas 12. Similarly each antenna element can act as a receiver antenna 11 or as a transmitter antenna 12. In an embodiment, groups of elements are used together to form larger receivers to detect faint or distant signals, and the element groups may be reduced in surface area (ultimately down to 1 element) to detect closer signals. In an embodiment, each of the antennas may be used as a receiver antenna 11, a transmitter antenna 12 or as a ground.

In an embodiment, the antennas may be laid out on a single layer; e.g., a layer of flex. In an embodiment, the antennas may be laid out on multiple layers; e.g., on one or two sides of one or more pieces of flex. In an embodiment, some or all of the antennas and some conductors may be laid out on the same layer, while other conductors and any remaining antennas are on a separate layer (e.g., separate substrate or separate side of the same substrate). As used herein, conductors and antennas can be interchangeable, however conductors (used herein) generally refer to the rows and columns. In an embodiment, the antennas and/or conductors may be embedded into a substrate, e.g., plastic, cloth or rubber. In an embodiment, the antennas and/or conductors may be placed on the surface of a substrate, e.g., plastic, cloth or rubber. In an embodiment, some antennas and/or conductors are embedded into a substrate while others are on the surface of the substrate. In an embodiment, the antennas and/or conductors are deployed on a flexible substrate. In an embodiment, the antennas and/or conductors are deployed on a flexible substrate so that deformation and changes in the relative orientation of the substrate can be detected.

Figure 8:
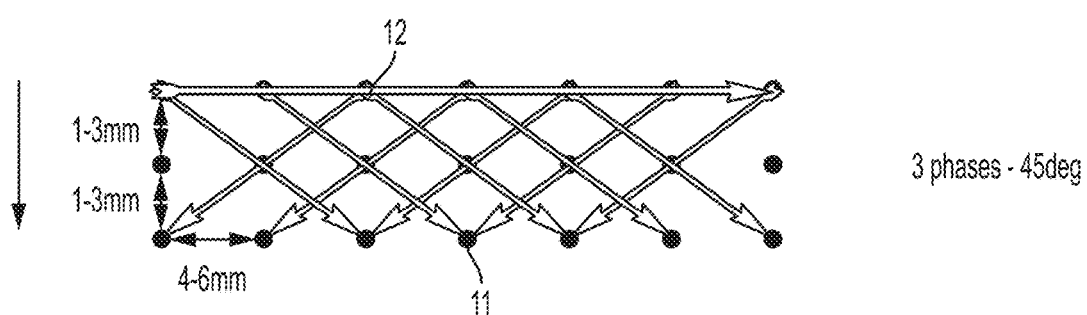
FIG. 8 is a diagram that illustrates the angular phase between transmitting and receiving antennas.
Figure 9:
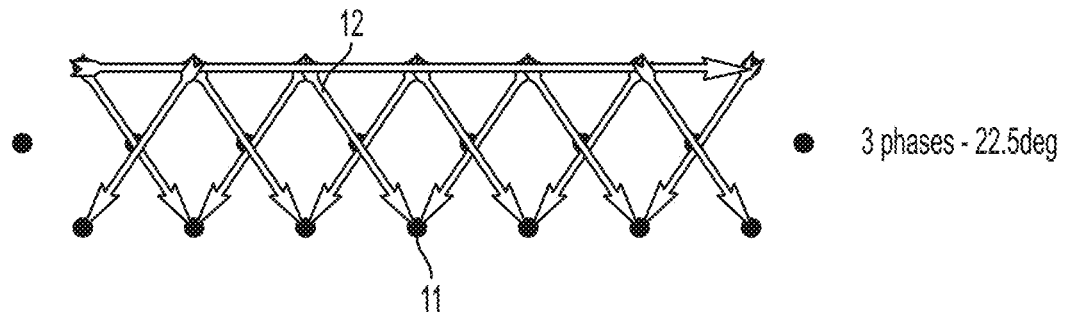
FIG. 9 is another diagram illustrating the angular phase between transmitting and receiving antennas.
Figure 10:
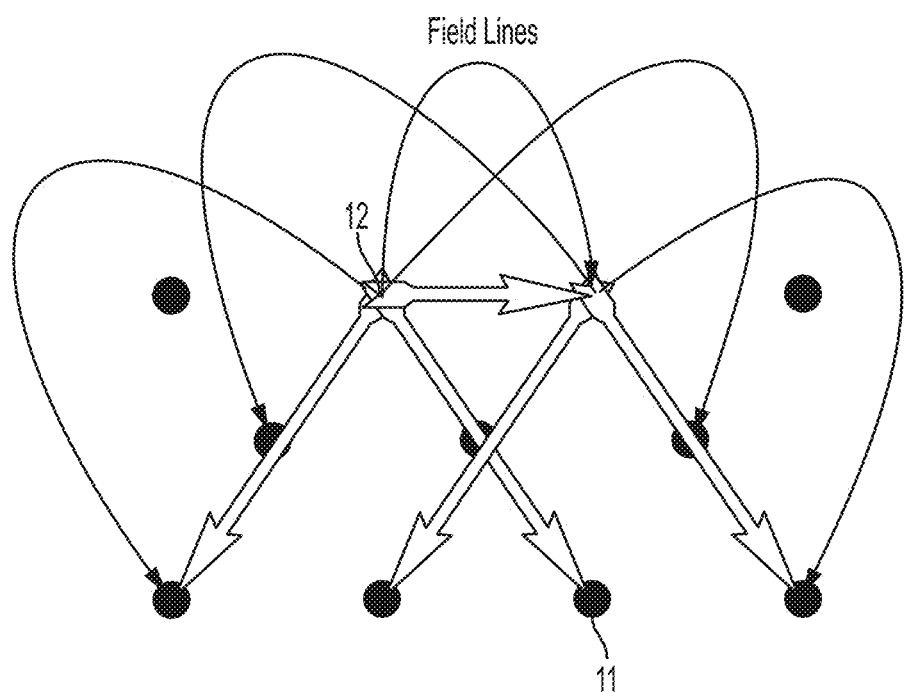
FIG. 10 is a diagram illustrating field lines and angular phase between transmitting and receiving antennas.

Turning to FIGS. 8-10, in embodiments where there are multiple layers of antennas various heat maps can be formed based on the interaction of transmitter antennas 12 and receiver antennas 11 located on different layers. FIG. 9 schematically illustrates the field lines produced by transmitter antenna 12 on various layers. Heat maps using transmitter antennas 12 and receiver antennas 11 on different layers can also use transmitter antennas 12 and receiver antennas 11 that that are located on the same plane but at different ranges. Similar in the way that heat maps could be formed from using measurements taken at different ranges, heat maps can be formed by using receiver antennas 11 and transmitter antennas 12 that have different angular relationships with respect to each other. The angular phase is the angular relationship that the transmitter antennas 12 have with respect to the receiver antennas 11 with respect to a given plane. So for example, if there are multiple layers of receiver antennas 11 and transmitter antennas 12, each layer would be a reference plane from which a measurement may be taken.

In FIG. 8, the angular phase that is being taken is at 45 degrees. The measurement of the signal from each transmitter antenna 12 from a receiver antenna 11 that is at a 45 degree angle with respect to each other is used. The arrangement of the antennas in the matrix will determine what potential angular phases can be used to create a heat map. Multiple heat maps can be taken using the various relationships between each respective receiver antennas 11 and each transmitter antennas 12.

In an embodiment, the ranges between antennas and the angular phases between antennas are used to form the heat maps. In an embodiment, only the ranges between antennas are used to form the heat maps. In an embodiment, only the angular phases between antennas are used to form the heat maps. In an embodiment, random relationships between different antennas are used to form heat maps. In an embodiment, the relationships present in different patterns are used are used to form heat maps. In an embodiment, radial relationships between antennas are used to form heat maps.

Figure 11:
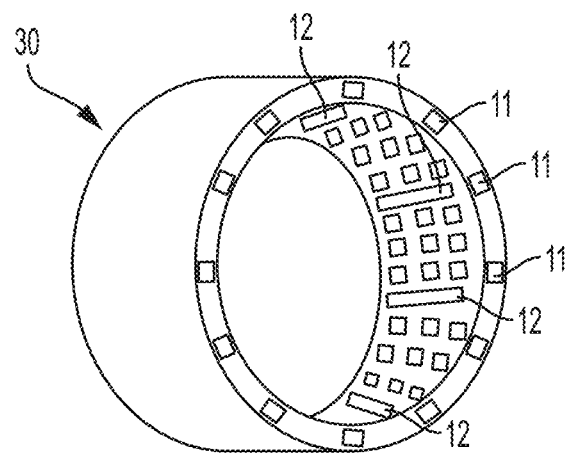
FIG. 11 shows a band having an array of antennas.

Turning to FIG. 11, a band 30 is shown having arrays of receiver antennas 11 and transmitter antennas 12. The band 30 can be worn on the body. In an embodiment, the band is flexible. In an embodiment, the band is designed to be worn on the body. In an embodiment, the band is designed to be worn around the wrist or palm. In an embodiment, the band is designed to be worn around the neck, leg, ankle, arm, chest, or other parts of the body. In an embodiment, the band is incorporated into a wearable article (e.g., shirt, pants, undergarments, gloves). In an embodiment, the band has an inner portion and an outer portion. In an embodiment, the band has an inner portion, an outer portion and an edge.

Still referring to FIG. 11, in an embodiment, antennas are placed on the inner portion of the band. In an embodiment, antennas placed on the inside surface may be configured as transmitters or receivers. In an embodiment, isolators which may be elongated antennas are deployed between one or more groups of other antennas. In an embodiment, the isolators and antennas on the inner portion of the band are configured to be in ohmic contact with the skin when the band is worn. In an embodiment, the isolators and antennas on the inner portion of the band are configured not to be in ohmic contact with the skin, but rather close to the skin, when the band is worn. In an embodiment, the isolators and antennas on the inner portion of the band are configured to be at a distance from the skin when the band is worn. In an embodiment, a dielectric material is between the skin, and the isolators and antennas.

In an embodiment, antennas are placed at the edge and/or on the outside surface of the band 30. Antennas placed on the edge and/or the outside surface may be configured as receiver antennas 11 and utilized as signal infusion receiver antennas 11. Antennas placed on the edge and/or the outside surface may be configured as transmitter antennas 12 and may be used as described herein for isolation or to create fields between the transmitter antenna 12 and a receiver antenna 11 that can be used to detect touch/hover.

In an embodiment, using a matrix of N×M transmitter antennas 12 and receiver antennas 11 affixed to a deformable substrate, the shape of the substrate may be modeled as a function of the relative distance and/or orientation between these transmitter antennas 12 and receiver antennas 11 (e.g. antenna elements). In an embodiment, compression, extension, or other surface deformations cause the orientation between the antennas to change. In an embodiment, compression, extension, or other surface deformations cause the distance between antennas to change. In an embodiment, the distance and/or orientation between the antennas may change due to strain or other force introduced to the substrate.

For example, global extension along a horizontal axis will change the distance and/or orientation between receiver antennas 11 and transmitter antennas 12. Similarly, local deformations (i.e. protrusions) will produce a change in orientation between receiver antennas 11 and transmitter antennas 12. In an embodiment, local deformations will cause changes in antenna orientation. In an embodiment, where the placement of the antenna array and substrate properties (e.g. elastic modulus) are known (or can be estimated), signal changes produced by varied antenna orientation can serve as basis for measurements to model surface deformation and shape.

In an embodiment, changes in skin deformation during finger articulation and hand movement can be sensed as relative orientation changes between antennas in a band 30 worn on the wrist or the palm. In an embodiment, the antennas can be located within layers changing the reference orientation of the deformable surface receiver antennas 11 and transmitter antennas 12 with the skin, allowing to model different levels of deformations of the skin resulting on the characterization of the motion of the hand and fingers.

Figure 12:
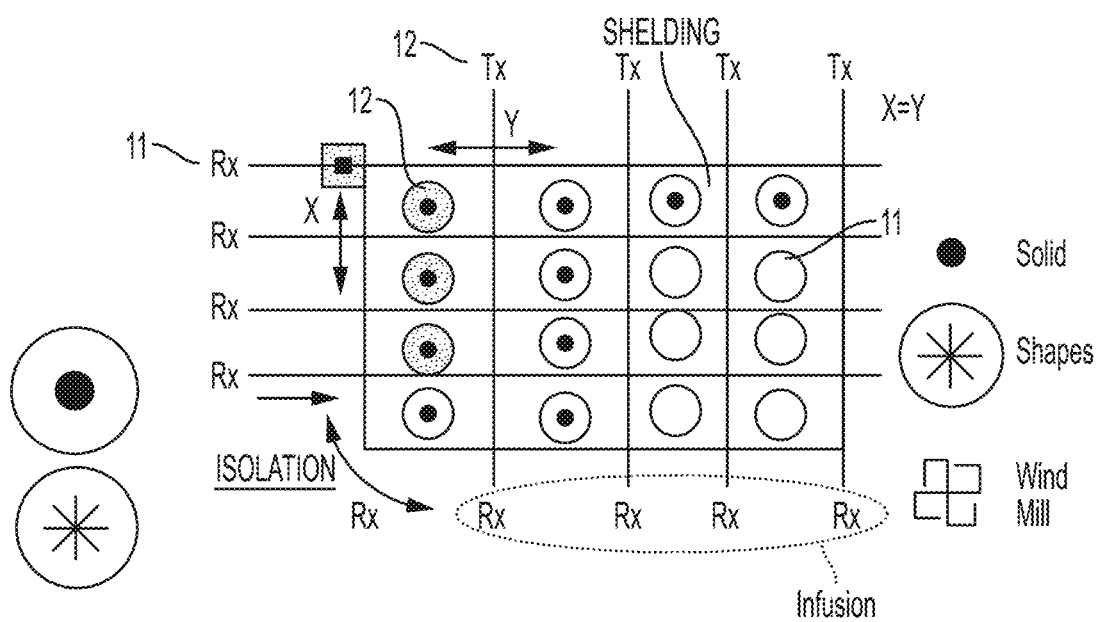
FIG. 12 is a diagram of the array of antennas.

Turning to FIG. 12, shown is a high level schematic diagram of a sensor configuration. In an embodiment, a plurality of shielded antennas are interspersed in a matrix of conductors. In an embodiment, each of the shielded antennas may be used as transmitter antennas 12, receiver antennas 11 or ground. In an embodiment, the shielding may be planar or e.g., boxed in by an isolator. In an embodiment, orthogonal groups of the conductor matrix are used as receiver antennas 11 and transmitter antennas 12. In an embodiment, the transmit conductors may be used for isolation (e.g., for isolating receivers with respect to an infusion signal), and may vary in width. In an embodiment, the matrix of conductors includes receiver conductors on one axis, and both receiver rand transmitter conductors on another. In an embodiment, the matrix of conductors includes receiver and transmitter conductors on each axis. FIG. 12 creates matrix of linearly extending rows and columns of conductors that are interspersed with antennas. The roles of transmitter antennas 12 and receiver antennas 11 can be varied and implemented in order to providing sensing date throughout the sensor configuration.

Figure 13:
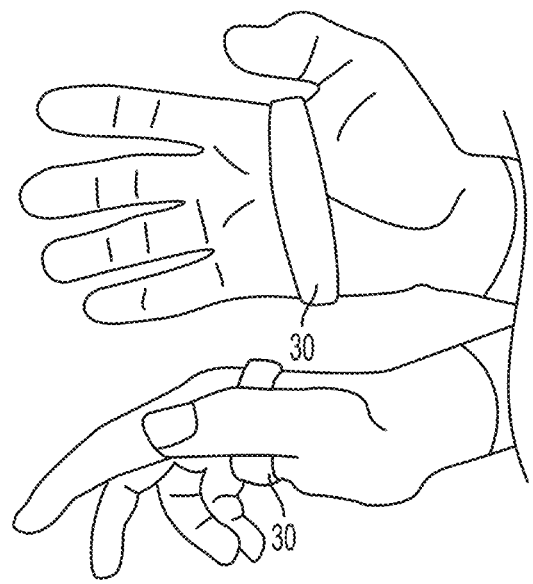
FIG. 13 illustrates a band that implements an array of antennas.
Figure 14:
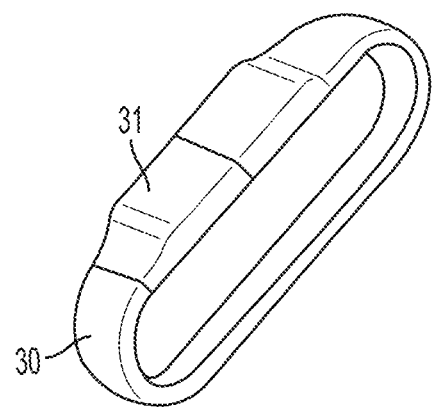
FIG. 14 is another view of a band that implements an array of antennas.
Figure 15:
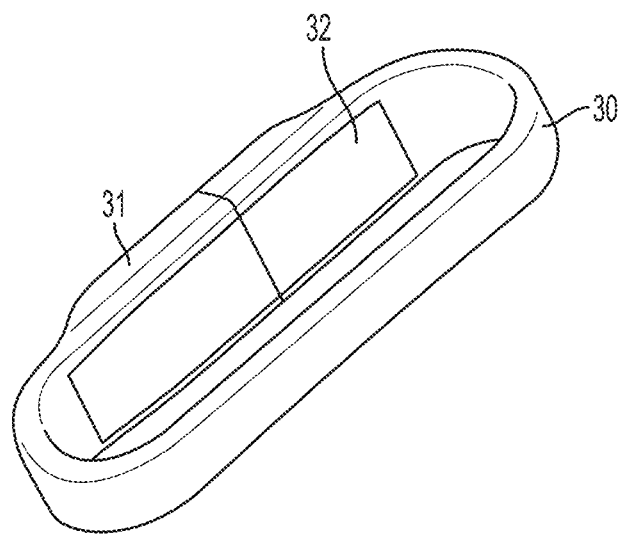
FIG. 15 is another view of a band that implements an array of antennas.

FIGS. 13-15 show various views of a band 30 incorporating a sensor in accordance with an embodiment of the invention. In an embodiment, as illustrated, various sensing areas may be present. For example in FIG. 14 the receiving band portion 31 may be located on the top portion of the band 30. In FIG. 15 a receiving band portion 32 may be located on the interior of the band 30.

Figure 16:
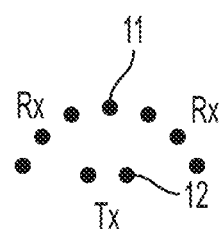
FIG. 16 shows an array of antennas.
Figure 17:
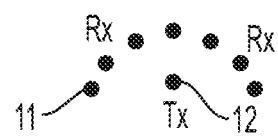
FIG. 17 shows another array of antennas.

FIGS. 15 and 16 illustrate an embodiment of an array of antennas employing geometric separation. In an embodiment, (in side view) there is a dome of receiver antennas 11 over the top of one or more transmitter antennas 12. The transmitter antennas 12 each generate a unique frequency orthogonal signal that is able to be received by each of the receiver antennas 11. The orientation of each of the receiver antennas 11 with respect to each of the transmitter antennas 12 is used in order to determine interaction with the sensor and model the movement of a hand or other body part.

In traditional capacitive sensor, a matrix is formed from receivers and transmitters, and "touch" is detected from interaction at the nodes (i.e., where a receiver and a transmitter cross). In an embodiment, receiver and transmitter conductors run in parallel, and multiple receivers interact with each transmitter. In an embodiment, receiver and transmitter conductors run in parallel, and multiple receivers interact with multiple transmitters. In an embodiment, receiver and transmitter conductors run in parallel, and receivers interact with multiple transmitters. In an embodiment, receiver and transmitters are formed from antennas (e.g., dots) and the dots are disbursed. In an embodiment, a disbursed dot receiver interacts with multiple dot transmitter; in an embodiment, multiple dispersed dot receivers interact with a dot transmitter; and in an embodiment, multiple dispersed dot receivers interact with multiple dispersed dot transmitters. In an embodiment, dot receivers are used with conductor transmitters; and in an embodiment, dot transmitters are used with conductor receivers.

Figure 18:
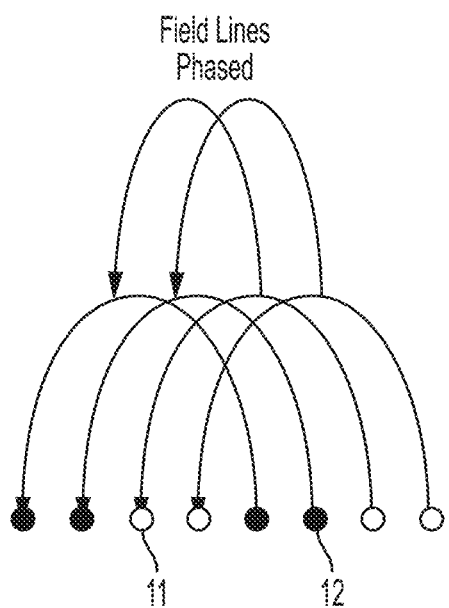
FIG. 18 illustrates field lines in dome shaped array of sensors.

FIG. 18 illustrates field lines in dome shaped array of sensors. The dome shaped array of sensors is formed from lines of receiver antennas and lines of transmitter antennas lines. The transmitter antennas 12 and receiver antennas 11 may alternate their respective roles. The field lines generated by the dome shaped antenna lines are shaped differently than those generated by the straight antennas or dot-like antennas. The properties of the field lines can be used to generate heat maps taken at different ranges and angular phases. Instead of being only in a two dimensional plane, the three dimensional orientation of the transmitter and receiver antennas create field lines that are able to be used in order to create heat maps that provide additional information related to the activity that occurs within the field lines. Multiple overlapping heat maps can be taken at the various ranges and angles at various times and simultaneously. In an embodiment, the overlapping field line data can be used to provide a more granular view of a sensed object. In an embodiment, the overlapping field line data can be processed to provide proximity information and location resolution. In an embodiment, the overlapping field line data can be processed to provide more delineation between separate components being detected (i.e. disambiguate fingers, etc.). In an embodiment, interpolation is used to process the data to identify touch. In an embodiment, the overlapping field line data is interpolated to provide both proximity information and location information.

Figure 19:
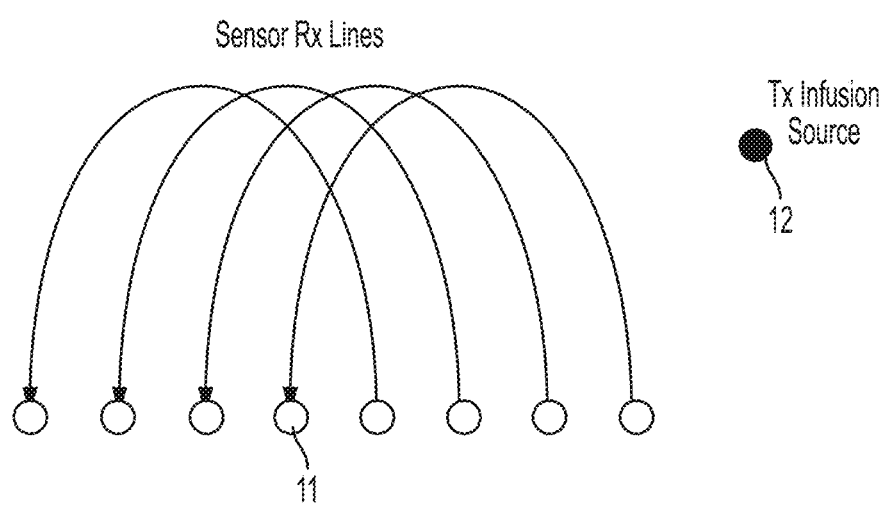
FIG. 19 shows dome shaped receiving lines and an infusion source.

FIG. 19 shows an embodiment of dome shaped receiver antennas 11 that are domed shaped receiver lines and a transmitter antenna 12 that is functioning as an infusion source. Additionally there may also be a plurality of transmitter antennas 12 that are dome shaped or formed as other arrangements of antennas. The transmitter antenna 12 that is infusing signal into the body of the user may be one of a plurality of transmitter antennas 12 located on the user's body or external to the body. The infusing transmitter antenna 12 may be employed in addition to the existing transmitter antennas and receiver antennas. The foregoing arrangement can be used in order to create varied heat maps that can vary in range and angular phase. Heat maps can be taken at different ranges and angular phases during multiple periods as well as simultaneously. This can be used in order to create overlapping field lines. In an embodiment, the overlapping field line data can be used to provide a more granular view of a sensed object. In an embodiment, the overlapping field line data can be processed to provide proximity information and location resolution. In an embodiment, the overlapping field line data can be processed to provide more delineation between separate components being detected (i.e. disambiguate fingers, etc.). In an embodiment, interpolation is used to process the data to identify touch. In an embodiment, the overlapping field line data is interpolated to provide both proximity information and location information.

Figure 20:
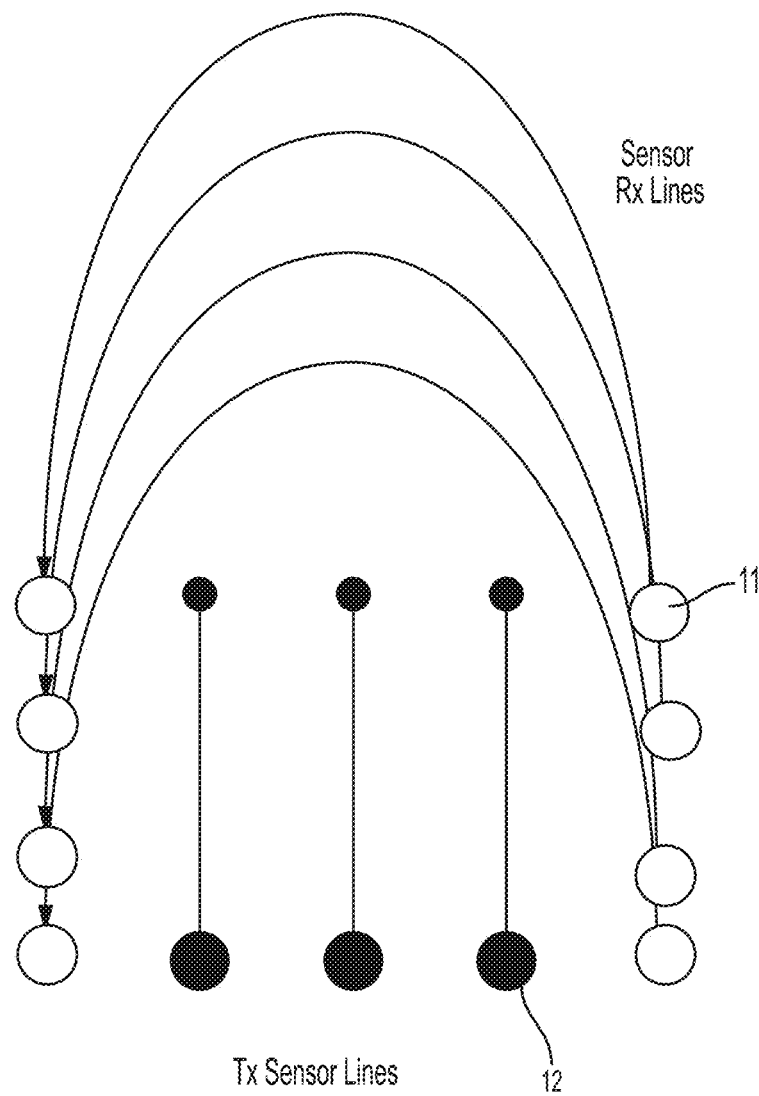
FIG. 20 shows a plurality of transmitter lines arranged beneath a plurality of domed receiving lines.

FIG. 20 shows a plurality of transmitter antennas 12 formed as transmitter antenna lines arranged beneath a plurality of receiver antennas 11 formed as domed receiving antenna lines. The field lines generated by this embodiment can be analyzed in a variety of different ways. The foregoing arrangement can be used in order to create varied heat maps that can vary in range and angular phase. Heat maps can be taken at different ranges and angular phases during multiple periods as well as simultaneously. Different range heat maps and angular phase heat maps can be used in order to obtain different measurements of the transmitted signals. In an embodiment, the overlapping field line data can be used to provide a more granular view of a sensed object. In an embodiment, the overlapping field line data can be processed to provide proximity information and location resolution. In an embodiment, the overlapping field line data can be processed to provide more delineation between separate components being detected (i.e. disambiguate fingers, etc.). In an embodiment, interpolation is used to process the data to identify touch. In an embodiment, the overlapping field line data is interpolated to provide both proximity information and location information.

Figure 21:
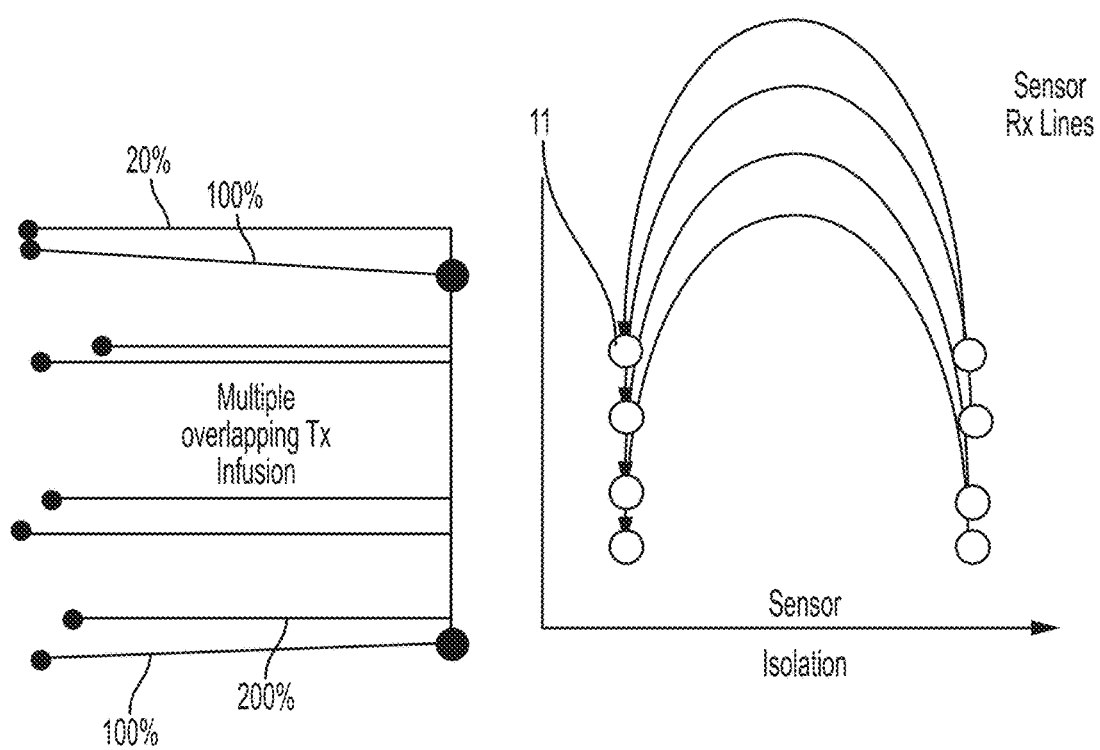
FIG. 21 shows a plurality of receiving lines used in conjunction with more than one infusion transmitter.

FIG. 21 shows a representation of multiple infusion transmitter antennas being used with receiver antennas 11 formed as dome shaped receiving lines. The infused transmission signal coming from various locations is able to be used determine information about the position of an object of interest. Furthermore, the attenuation gradient that results from the signal as it is transmitted through a user's body is also able to be used to ascertain additional information regarding the signals. This information is then used to construct the heat maps and provide information regarding hand position, gestures, etc. The foregoing arrangement can be used in order to create varied heat maps that can vary in range and angular phase. Heat maps can be taken at different ranges and angular phases during multiple periods as well as simultaneously. The overlapping field lines as well as the attenuation gradient can be used to provide a more granular view of a sensed object. In an embodiment, the overlapping field lines as well as the attenuation gradient can be processed to provide proximity information and location resolution. In an embodiment, the overlapping field line data can be processed to provide more delineation between separate components being detected (i.e. disambiguate fingers, etc.). In an embodiment, interpolation is used to process the data to identify touch. In an embodiment, the overlapping field lines as well as the attenuation gradient is interpolated to provide both proximity information and location information. In this same manner, data can be measured, collected and processed in other one-dimensional configurations, in two dimensional configurations and in three dimensional configurations to provide proximity and location information.

Figure 22:
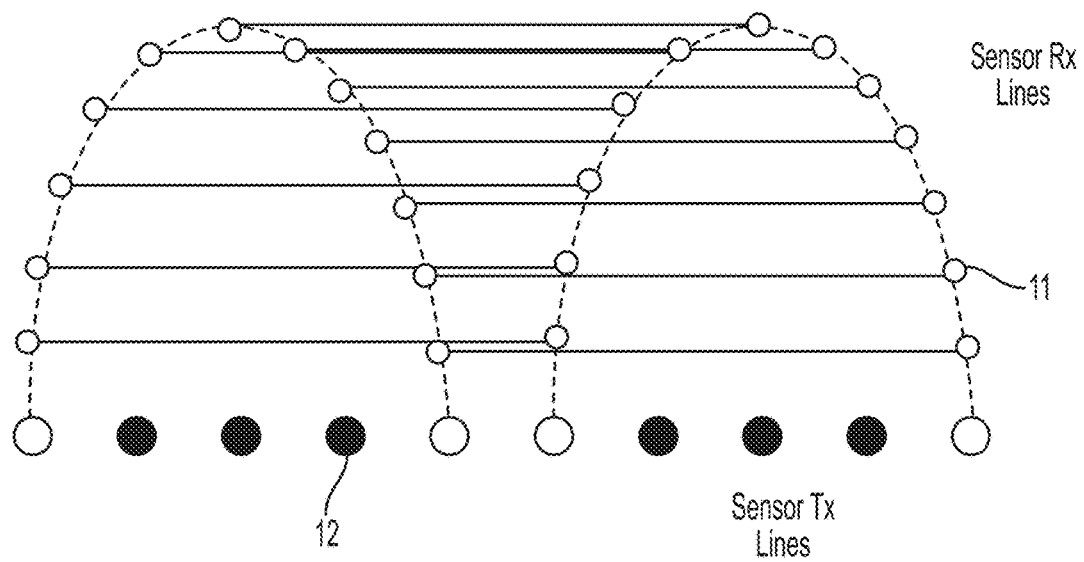
FIG. 22 shows a plurality of receiver lines arranged with lines perpendicular to the finger plane of motion.

FIG. 22 shows an embodiment wherein a plurality of transmitter antennas 12 are formed as transmitter lines arranged beneath a plurality of receiver antennas 11 formed as domed receiving lines. The embodiments shown in both FIG. 21 and FIG. 22 may be employed in a hybrid sensor using both types of arrangements. Furthermore, any one of the embodiments described or contemplated herein can be used together or formed in a combined sensor. The receiver antennas 11 are arranged with the antenna lines perpendicular to the finger plane of motion. The field lines generated by this embodiment can be analyzed in a variety of different ways. The foregoing arrangement can be used in order to create varied heat maps that can vary in range and angular phase. Heat maps can be taken at different ranges and angular phases during multiple periods as well as simultaneously. Different range heat maps and angular phase heat maps can be used in order to obtain different measurements of the transmitted signals. In an embodiment, the overlapping field line data can be used to provide a more granular view of a sensed object. In an embodiment, the overlapping field line data can be processed to provide proximity information and location resolution. In an embodiment, the overlapping field line data can be processed to provide more delineation between separate components being detected (i.e. disambiguate fingers, etc.). In an embodiment, interpolation is used to process the data to identify touch. In an embodiment, the overlapping field line data is interpolated to provide both proximity information and location information.

Figure 23:
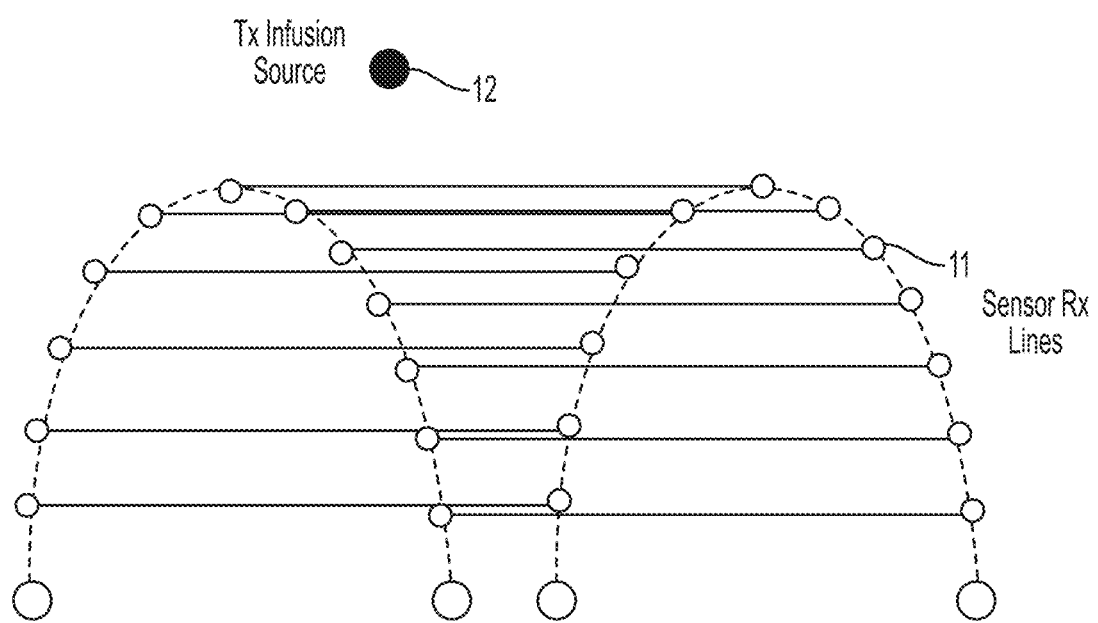
FIG. 23 shows a plurality of receiving lines and an infusion source.

FIG. 23 shows a plurality of receiver antennas 11 formed as receiver lines arranged with the lines perpendicular to the finger plane of motion. A transmitter antenna 12 is an infusion signal source which infuses signal into the body of the user. This arrangement can also be used with additional lines of transmitter antennas and receiver antennas. This arrangement can be used to generate heat maps and overlapping field lines. The field lines generated by this embodiment can be analyzed in a variety of different ways. The foregoing arrangement can be used in order to create varied heat maps that can vary in range and angular phase. Heat maps can be taken at different ranges and angular phases during multiple periods as well as simultaneously. Different range heat maps and angular phase heat maps can be used in order to obtain different measurements of the transmitted signals. In an embodiment, the overlapping field line data can be used to provide a more granular view of a sensed object. In an embodiment, the overlapping field line data can be processed to provide proximity information and location resolution. In an embodiment, the overlapping field line data can be processed to provide more delineation between separate components being detected (i.e. disambiguate fingers, etc.). In an embodiment, interpolation is used to process the data to identify touch. In an embodiment, the overlapping field line data is interpolated to provide both proximity information and location information.

Figure 24:
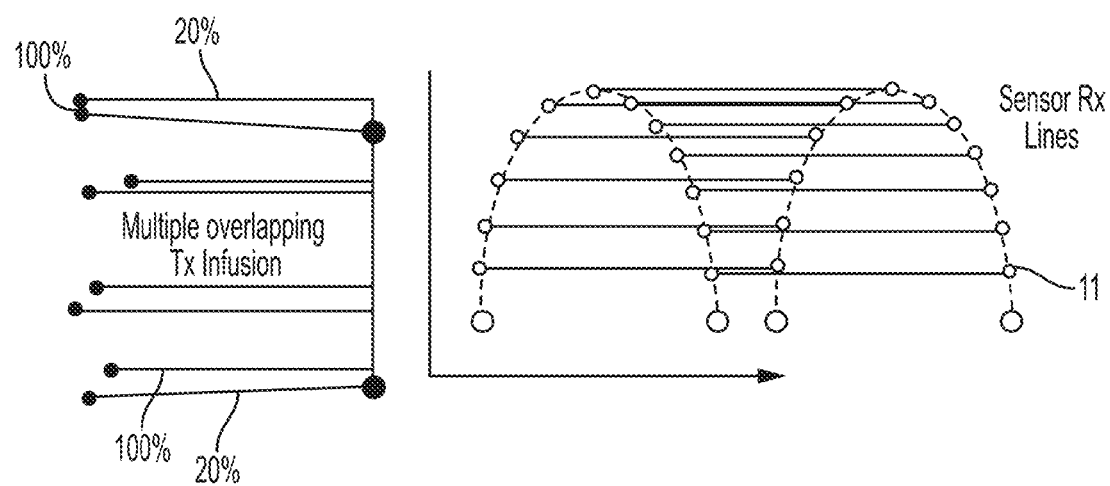
FIG. 24 shows a gradient blended transmitter infusion combined with a domed receiver lines.

FIG. 24 shows a gradient blended transmitter infusion signals being blended with the field lines generated by receiver antennas 11 that are formed with lines perpendicular to the finger plane of motion. The sensor methods outlined above may be merged so that both perpendicular and parallel antenna lines are combined with domed antenna lines. The infused transmission signal coming from various locations is able to be used determine information about the position of an object of interest. Furthermore, the attenuation gradient that results from the signal as it is transmitted through a user's body is also able to be used to ascertain additional information regarding the signals. This information is then used to construct the heat maps and provide information regarding hand position, gestures, etc. The foregoing arrangement can be used in order to create varied heat maps that can vary in range and angular phase. Heat maps can be taken at different ranges and angular phases during multiple periods as well as simultaneously. The overlapping field lines as well as the attenuation gradient can be used to provide a more granular view of a sensed object. In an embodiment, the overlapping field lines as well as the attenuation gradient can be processed to provide proximity information and location resolution. In an embodiment, the overlapping field line data can be processed to provide more delineation between separate components being detected (i.e. disambiguate fingers, etc.). In an embodiment, interpolation is used to process the data to identify touch. In an embodiment, the overlapping field lines as well as the attenuation gradient is interpolated to provide both proximity information and location information.

The various embodiments described above can be used to produce various field lines that are able to be analyzed in a variety of different ways. The field lines can be analyzed to produce heat maps at different ranges and at different angular phases. The various relationships of the antennas with respect to each other can be used to produce an accurate view of the motions of hand at multiple degrees of resolution. Furthermore, the various organization and shape of the antennas (line antennas, dome shaped line antennas, dot antennas, etc.) can further be used to create complex views of the gestures and movements of a hand.

As aspect of the present disclosure is a sensor system. The sensor system comprises a first pair of antennas, wherein one of the first pair of antennas is a transmitter antenna and a second of the first pair of antennas is a receiver antenna; a second pair of antennas located further apart from each other than the first pair of antennas are located from each other, wherein one of the second pair of antennas is a transmitter antenna and a second of the second pair of antennas is a receiver antenna; wherein each of the transmitter antennas transmits a unique frequency orthogonal signal; and a signal processor adapted to process signals received by the receiver antennas to determine a measurement of the received signals, wherein measurements of received signals from the second pair of antennas provides information regarding activity within field lines that is different than the measurements of received signals from the first pair of antennas.

Another aspect of the present disclosure is a sensor system. The sensor system comprises a first pair of antennas, wherein one of the first pair of antennas is a transmitter antenna and a second of the first pair of antennas is a receiver antenna; a second pair of antennas located further apart from each other than the first pair of antennas are located from each other, wherein one of the second pair of antennas is a transmitter antenna and a second of the second pair of antennas is a receiver antenna; a third pair of antennas, wherein one of the third pair of antennas is a transmitter antenna and one of the third pair of antennas is a receiver antenna, wherein each of the transmitter antennas transmits a unique frequency orthogonal signal; wherein transmitted signals from the first, second and third pair of antennas form overlapping field lines; and a signal processor adapted to process signals received by the receiver antennas to determine a measurement of the received signals, wherein measurements of the overlapping field lines form heat maps providing information regarding a sensed object.

Although examples have been fully described with reference to the accompanying drawings, it is to be noted that various changes and modifications will become apparent to those skilled in the art. Such changes and modifications are to be understood as being included within the scope of the various examples as defined by the appended claims.

The invention claimed is:

1. A sensor system, comprising:
a first pair of antennas, wherein one of the first pair of antennas is a transmitter antenna and a second of the first pair of antennas is a receiver antenna;
a second pair of antennas located further apart from each other than the first pair of antennas are located from each other, wherein one of the second pair of antennas is a transmitter antenna and a second of the second pair of antennas is a receiver antenna;
wherein each of the transmitter antennas transmits a unique frequency orthogonal signal; and
a signal processor adapted to process signals received by the receiver antennas to determine a measurement of the received signals, wherein measurements of received signals from the second pair of antennas provides information regarding activity within field lines that is different than the measurements of received signals from the first pair of antennas.

2. The sensor system of claim 1, further comprising a transmitter antenna adapted to infuse signal into the body of a user.

3. The sensor system of claim 2, wherein an attenuation gradient from the infused signal is used to ascertain additional information regarding received signals.

4. The sensor system of claim 1, wherein the processed signals are used to form heat maps.

5. The sensor system of claim 1, further comprising a third pair of antennas, wherein one of the third pair of antennas is a transmitter antenna and one of the third pair of antennas is a receiver antenna.

6. The sensor system of claim 5, wherein the distance between the third pair of antennas and the second pair of antennas is the same and the signal processor is adapted to form heat maps from received signals on the second pair of antennas and the third pair of antennas that are received simultaneously.

7. The sensor system of claim 5, wherein the distance between the third pair of antennas and the second pair of antennas is the different and the signal processor is adapted to form heat maps from received signals on the second pair of antennas and the third pair of antennas that are received simultaneously.

8. The sensor system of claim 5, wherein distance between the first pair of antennas, the third pair of antennas and the second pair of antennas is the same and the signal processor is adapted to form heat maps from received signals on the first, second and third pair of antennas that are received simultaneously.

9. The sensor system of claim 5, wherein the first, second and third pair of antennas form overlapping field lines of transmitted and received signals, wherein the signal processor uses overlapping field line measurements to form heat maps.

10. The sensor system of claim 5, wherein the first, second and third pair of antennas form overlapping field lines of transmitted and received signals, wherein the signal processor uses overlapping field line measurements to form heat maps providing multiple views of a sensed object.

11. The sensor system of claim 5, wherein the first, second and third pair of antennas form overlapping field lines of transmitted and received signals, wherein the signal processor uses overlapping field line measurements to form heat maps providing a proximity view and a granular view of a sensed object.

12. The sensor system of claim 5, wherein the first, second and third pair of antennas form overlapping field lines of transmitted and received signals, wherein the signal processor uses overlapping field line measurements to form heat maps providing information at different ranges.

13. The sensor system of claim 5, wherein the first, second and third pair of antennas form overlapping field lines of transmitted and received signals, wherein the signal processor uses overlapping field line measurements to form heat maps providing information at different angular phases.

14. A sensor system, comprising:
a first pair of antennas, wherein one of the first pair of antennas is a transmitter antenna and a second of the first pair of antennas is a receiver antenna;
a second pair of antennas located further apart from each other than the first pair of antennas are located from each other, wherein one of the second pair of antennas is a transmitter antenna and a second of the second pair of antennas is a receiver antenna;
a third pair of antennas, wherein one of the third pair of antennas is a transmitter antenna and one of the third pair of antennas is a receiver antenna;
wherein each of the transmitter antennas transmits a unique frequency orthogonal signal;
wherein transmitted signals from the first, second and third pair of antennas form overlapping field lines; and
a signal processor adapted to process signals received by the receiver antennas to determine a measurement of the received signals, wherein measurements of the overlapping field lines form heat maps providing information regarding a sensed object.

15. The sensor system of claim 14, wherein the information regarding the sensed object is a proximity view of the sensed object.

16. The sensor system of claim 14, wherein the information regarding the sensed object is a granular view of the sensed object.

17. The sensor system of claim 14, wherein the information regarding the sensed object is a proximity view and granular view of the sensed object.

18. The sensor system of claim 14, further comprising a transmitter antenna adapted to infuse signal into the body of a user.

19. The sensor system of claim 18, wherein an attenuation gradient from the infused signal is used to ascertain additional information regarding received signals.

20. The sensor system of claim 14, wherein the distance between the third pair of antennas and the second pair of antennas is the different and the signal processor is adapted to form heat maps from received signals on the second pair of antennas and the third pair of antennas that are received simultaneously.

* * * * *